F. COUSIN.
ANIMAL EXERCISER.
APPLICATION FILED MAR. 29, 1911.
1,006,182.
Patented Oct. 17, 1911.
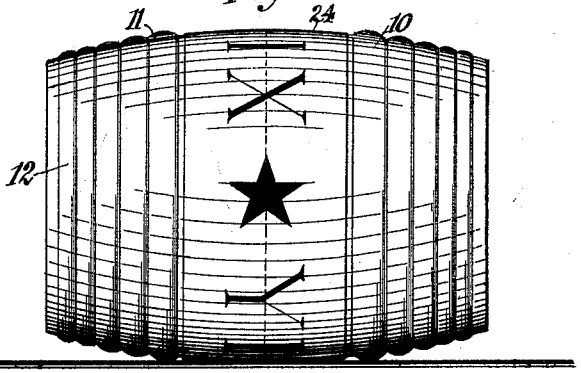
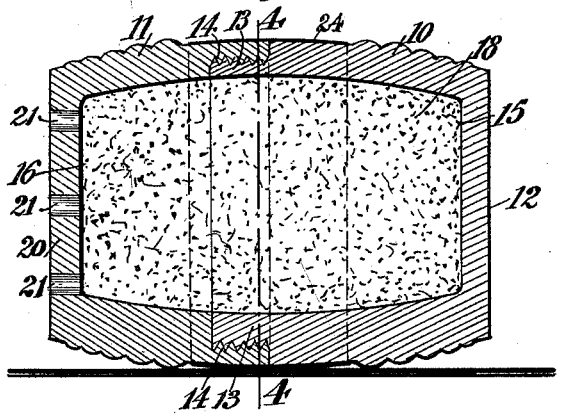
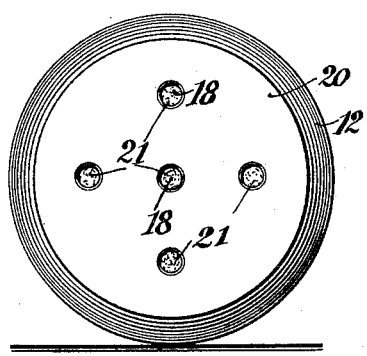
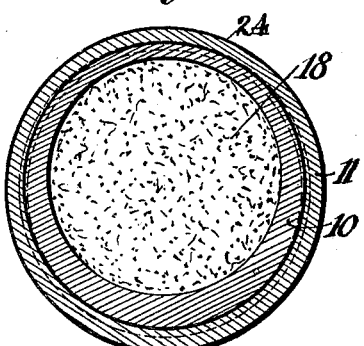
Witnesses:
L. J. Murphy
John Murtagh
Inventor
Frank Cousin,
By his Attorneys

UNITED STATES PATENT OFFICE.

FRANK COUSIN, OF NEW YORK, N. Y.

ANIMAL-EXERCISER.

1,006,182.  Specification of Letters Patent.  Patented Oct. 17, 1911.

Application filed March 29, 1911. Serial No. 617,648.

*To all whom it may concern:*

Be it known that I, FRANK COUSIN, a citizen of the United States, residing in New York, in the State of New York, have invented certain new and useful Improvements in Animal-Exercisers, of which the following is a specification.

This invention relates to devices adapted to induce exercise in and give amusement to animals, and more particularly feline animals, and the object of the invention is to provide a simple, inexpensive and effective device of this kind.

The invention consists of a barrel-shaped hollow structure made in two parts, separable at the middle, one part having a screw-threaded projection entering a screw-threaded portion of the other part, by means of which the two parts are detachably connected, the cavities in the two parts being arranged eccentrically of the axis of the barrel, also arranged nearer one end than the other, and holes through one of the ends of the structure for permitting escape of a portion of the contents, or odor of the contents, of the same.

In the accompanying drawings, Figure 1 is a side view of an exerciser embodying my invention, Fig. 2 is an end view of the same, Fig. 3 is a longitudinal section on the axis of the device, and Fig. 4 is a transverse section on line 4—4 of Fig. 3.

Similar numerals of reference indicate corresponding parts.

Referring to the drawing, 10, 11 indicate the respective parts of the barrel-shaped structure 12. The part 10 is provided with a projection 13 having an exterior screw-thread whereby it is adapted to detachably engage the part 11 provided with a corresponding interior screw-thread 14, the two parts being thereby secured together, and capable of being separated when desired. Each part 10, 11, is provided with a recess or cavity, arranged eccentrically of the axis of the device, as shown in Fig. 4, said cavities 15, 16, being arranged so as to register with each other when the two parts 10, 11 are screwed together, and thereby form one inclosed cavity, in which is placed a body of catnip 18 or other substance attractive to the animals to be exercised. The cavity extends nearer to one end of the barrel-shaped structure than to the other, as indicated in Fig. 3, whereby the barrel is caused to roll in a curve instead of in a straight line, and one end 20 of the barrel is provided with holes 21 of suitable number and size to permit escape from time to time of small portions of the contents of the barrel and of the odor from the same. The barrel is provided with circumferential ribs representing hoops and forming a circumferential recess centrally of the barrel between the innermost rib 23 of the section 11 and the innermost rib 24 of the section 10. These ribs 23 and 24 serve as bearing surfaces and operate to steady the barrel in its rolling motion. In its efforts to obtain the contents of the barrel, the animal paws and thereby moves the device about the floor, and is induced to follow the device in its movements.

A printed label 24 of paper or other material is glued to the barrel around the middle of the same, and prevents the loosening of the parts of the barrel from each other, and adds to the interest of the movement of the barrel over the floor.

The device has an eccentric action in the direction of its periphery, due to the eccentric location of the cavity, whereby only when in one position, namely when the center of gravity is at its lowest point, will the device be at rest. A rotation over the floor has an accelerated movement, and then the device is brought to rest, quicker than devices in which such eccentric action is not present. The objection to exercisers used hitherto, namely that their spherical shape permitted them to be rolled quickly from one end of the room to the other, thereby causing the dashing of the animal about the room, with resulting disturbance, is thus avoided, and an exerciser having a restrained movement is provided.

The contents 18 of the device may consist of dried catnip, which is especially suitable for all felines, or of any other substance possessing attractive qualities to the animal to be exercised.

I have described one embodiment of my invention, but it is obvious that changes may be made in the details without departing from the spirit of the same.

Having thus described my invention, I claim as new and desire to secure by Letters Patent:—

1. As an article of manufacture, an exerciser for animals, comprising a barrel-shaped body having a cavity eccentric to its exterior surface and adapted to hold a substance attractive to the animal, said barrel-shaped body being made in two parts, screw-threaded together, and one of said parts having openings for escape of the contents from said cavity.

2. As an article of manufacture, an exerciser for animals, comprising a barrel-shaped body having a cavity eccentric to its exterior surface and nearer one end than the other and adapted to hold a substance attractive to the animal, said barrel-shaped body being made in two parts, screw-threaded together, and one of said parts having openings for escape of the contents from said cavity.

3. As an article of manufacture, an exerciser for animals, comprising a barrel-shaped body having a cavity eccentric to its exterior surface and adapted to hold a pungent substance attractive to the animals, said barrel-shaped body being provided with an opening into said cavity for the escape of odor from the contents and on its exterior with ribs representing hoops serving as rolling contacts.

4. As an article of manufacture, an exerciser for animals comprising a barrel-shaped body having a cavity eccentric to its exterior surface and disposed nearer one end than the other and adapted to hold a pungent substance attractive to the animal, said body being provided with an opening into said cavity for the escape of odor from the contents of said cavity.

5. As an article of manufacture, an exerciser for animals comprising a barrel-shaped body having a cavity eccentric to its exterior surface and adapted to hold a pungent substance attractive to the animal, said body being provided with an opening for the escape of odor from the contents of said cavity.

In testimony, that I claim the foregoing as my invention, I have signed my name in presence of two subscribing witnesses.

FRANK COUSIN.

Witnesses:
L. J. MURPHY,
JOHN MURTAGH.

---

Copies of this patent may be obtained for five cents each, by addressing the "Commissioner of Patents, Washington, D. C."